(12) United States Patent
Petersen et al.

(10) Patent No.: US 9,398,397 B2
(45) Date of Patent: Jul. 19, 2016

(54) SECURE MANIPULATION OF EMBEDDED MODEM CONNECTION SETTINGS THROUGH SHORT MESSAGING SERVICE COMMUNICATION

(71) Applicant: Ford Global Technologies, LLC, Dearborn, MI (US)

(72) Inventors: Brian Petersen, Beverly Hills, MI (US); Praveen Yalavarty, Novi, MI (US); Ritesh Pandya, Rochester Hills, MI (US); Joseph Paul Rork, Plymouth, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 77 days.

(21) Appl. No.: 14/151,531

(22) Filed: Jan. 9, 2014

(65) Prior Publication Data
US 2015/0195364 A1  Jul. 9, 2015

(51) Int. Cl.

| | |
|---|---|
| *H04L 9/32* | (2006.01) |
| *G06F 11/00* | (2006.01) |
| *H04L 12/28* | (2006.01) |
| *G06F 15/177* | (2006.01) |
| *H04W 4/00* | (2009.01) |
| *H04W 12/04* | (2009.01) |
| *H04W 4/04* | (2009.01) |
| *H04L 29/06* | (2006.01) |
| *H04L 12/24* | (2006.01) |
| *H04L 12/701* | (2013.01) |
| *H04L 12/751* | (2013.01) |
| *H04W 12/02* | (2009.01) |

(52) U.S. Cl.
CPC .............. *H04W 4/001* (2013.01); *H04W 4/046* (2013.01); *H04W 12/04* (2013.01); *H04L 41/12* (2013.01); *H04L 45/00* (2013.01); *H04L 45/02* (2013.01); *H04L 63/0428* (2013.01); *H04L 63/18* (2013.01); *H04W 12/02* (2013.01)

(58) Field of Classification Search
CPC ..... H04L 63/0428; H04L 45/00; H04L 41/12; H04L 45/02
USPC .................... 713/168; 370/228, 254; 709/220
See application file for complete search history.

(56) References Cited

U.S. PATENT DOCUMENTS

| | | | |
|---|---|---|---|
| 5,155,847 A | 10/1992 | Kirouac et al. | |
| 6,718,141 B1 * | 4/2004 | deVette | H04B 10/0771 370/218 |
| 7,055,149 B2 | 5/2006 | Birkholz et al. | |
| 7,209,859 B2 | 4/2007 | Zeif | |

(Continued)

*Primary Examiner* — Aravind Moorthy
(74) *Attorney, Agent, or Firm* — Jennifer M. Stec; Brooks Kushman P.C.

(57) ABSTRACT

A vehicle may include at least one controller configured to maintain a communication channel over a network between a vehicle and a vehicle service server accessible through an access point node. The at least one controller may be further configured to receive, over the network out-of-band from the communication channel, an update message including updated communication channel connection information, and upon receiving the message, reconnect the communication channel according to the updated connection information. A secure server may be configured to generate the update message specifying at least one of updated access point node information and updated address information, encrypt the update message according to an encryption key shared with a vehicle destination, and provide the update message over a network to the vehicle out-of-band from the communication channel.

20 Claims, 3 Drawing Sheets

(56) References Cited

U.S. PATENT DOCUMENTS

| | | |
|---|---|---|
| 7,822,775 B2 | 10/2010 | Langer |
| 8,427,979 B1 | 4/2013 | Wang |
| 2004/0064385 A1 | 4/2004 | Tamaki |
| 2005/0144616 A1 | 6/2005 | Hammond et al. |
| 2008/0140278 A1 | 6/2008 | Breed |
| 2009/0064123 A1 | 3/2009 | Ramesh et al. |
| 2009/0088141 A1 | 4/2009 | Suurmeyer et al. |
| 2011/0105029 A1 | 5/2011 | Takayashiki et al. |
| 2011/0306329 A1 | 12/2011 | Das |
| 2012/0094643 A1 | 4/2012 | Brisebois et al. |
| 2012/0142367 A1 | 6/2012 | Przybylski |
| 2013/0122819 A1* | 5/2013 | Vuyyuru et al. .............. 455/62 |
| 2013/0130665 A1 | 5/2013 | Peirce et al. |
| 2015/0082370 A1* | 3/2015 | Jayaraman ........... H04L 63/20 726/1 |
| 2015/0271247 A1* | 9/2015 | Patsiokas ............ H04L 67/06 709/217 |

* cited by examiner

SECURE MANIPULATION OF EMBEDDED MODEM CONNECTION SETTINGS THROUGH SHORT MESSAGING SERVICE COMMUNICATION

TECHNICAL FIELD

The illustrative embodiments generally relate to a method and apparatus for updating communication settings of an in-vehicle communication module.

BACKGROUND

Various methods exist for vehicles to communicate with entities external to the vehicle. In many examples, vehicles may make connections to remote servers using embedded cellular modem devices. In other example, vehicles may utilize vehicle-to-vehicle connectivity to send messages directly between vehicles, or vehicle-to-residence connectivity such as automatic garage openers. For vehicles to make connections to entities external to the vehicle, the vehicle may be required to maintain connection information regarding how to connect to the external entity. However, updating the connection information over a connection may be difficult to perform when the vehicle is unable to connect to the entity.

SUMMARY

A computer-implemented method includes maintaining a communication channel over a network between a vehicle and a vehicle service server accessible through an access point node; receiving, over the network out-of-band from the communication channel, an update message including updated communication channel connection information; and upon receiving the message, reconnecting the communication channel according to the updated connection information.

A vehicle may include at least one controller configured to perform operations including maintaining a communication channel over a network between a vehicle and a vehicle service server accessible through an access point node; receiving, over the network out-of-band from the communication channel, an update message including updated communication channel connection information; and upon receiving the message, reconnecting the communication channel according to the updated connection information.

A system may include a secure server configured to perform operations including generating an update message specifying at least one of updated access point node information and updated address information; encrypting the update message according to an encryption key shared with a vehicle destination; and providing the update message over a network to the vehicle out-of-band from a communication channel between the vehicle and a vehicle service server accessible through an access point node.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

An in-vehicle device may store information used to connect the device to a remote network. For cellular applications this information may include access point information relating to how a vehicle connects to an access point network (APN), and address information relating to an endpoint accessible over the APN. The access point information may include, as some examples, a gateway server address and other connection information and settings. The address information may include, for example, an internet protocol (IP) address or a uniform resource locator (URL).

The in-vehicle device may use the access point and address information to access a vehicle services server providing one or more services to the vehicle. These services may include, as some examples, turn-by-turn directions, traffic, weather, and provisioning of software updates to vehicle components. The APN may provide adequate security for vehicle communication, but may cause reconfiguration challenges if the access point or address information require updating. As the vehicle may be programmed to communicate with a predefined access point and address without routing through an intermediary or proxy, access to the vehicle services server may be required to change the access point and address information. Thus, if a vehicle manufacturer or other third party wishes to temporarily or permanently change the vehicle services server or APN to which the vehicle connects, the third party may have a dependency on the outgoing server (or a maintainer of the server) to aid in changing over the vehicles to utilize new APN and address information. This dependency may be undesirable in certain cases, such as when the server to be moved away from is maintained by a former technology partner unwilling or unable to update the vehicle information. As another example, access point and address information may be difficult to change temporarily when diagnosing vehicle connection issues.

An in-vehicle system may be configured to support the remote updating of vehicle APN and address information using a messaging service reachable without use of the APN and address information. Using cellular short messaging service (SMS) messaging as an example, a messenger external to the vehicle may send an SMS update message to the vehicle including new APN and/or address information. Once received, the vehicle may be configured to disconnect from the current APN and address information, and connect to the new APN and address information.

To ensure that the modem APN and address information cannot be changed by a user unauthorized to do so (e.g., a system not under the control of the vehicle manufacturer or its affiliates or partners), the update message may be encrypted. As one possibility, the update message may be encrypted according to the advanced encryption standard (AES), using a secret key unknown to unauthorized users. As the key required to provide the update messages may remain secret, a rouge actor or malicious user may be unable to redirect the vehicle to unauthorized APN and address settings.

Figure 1:
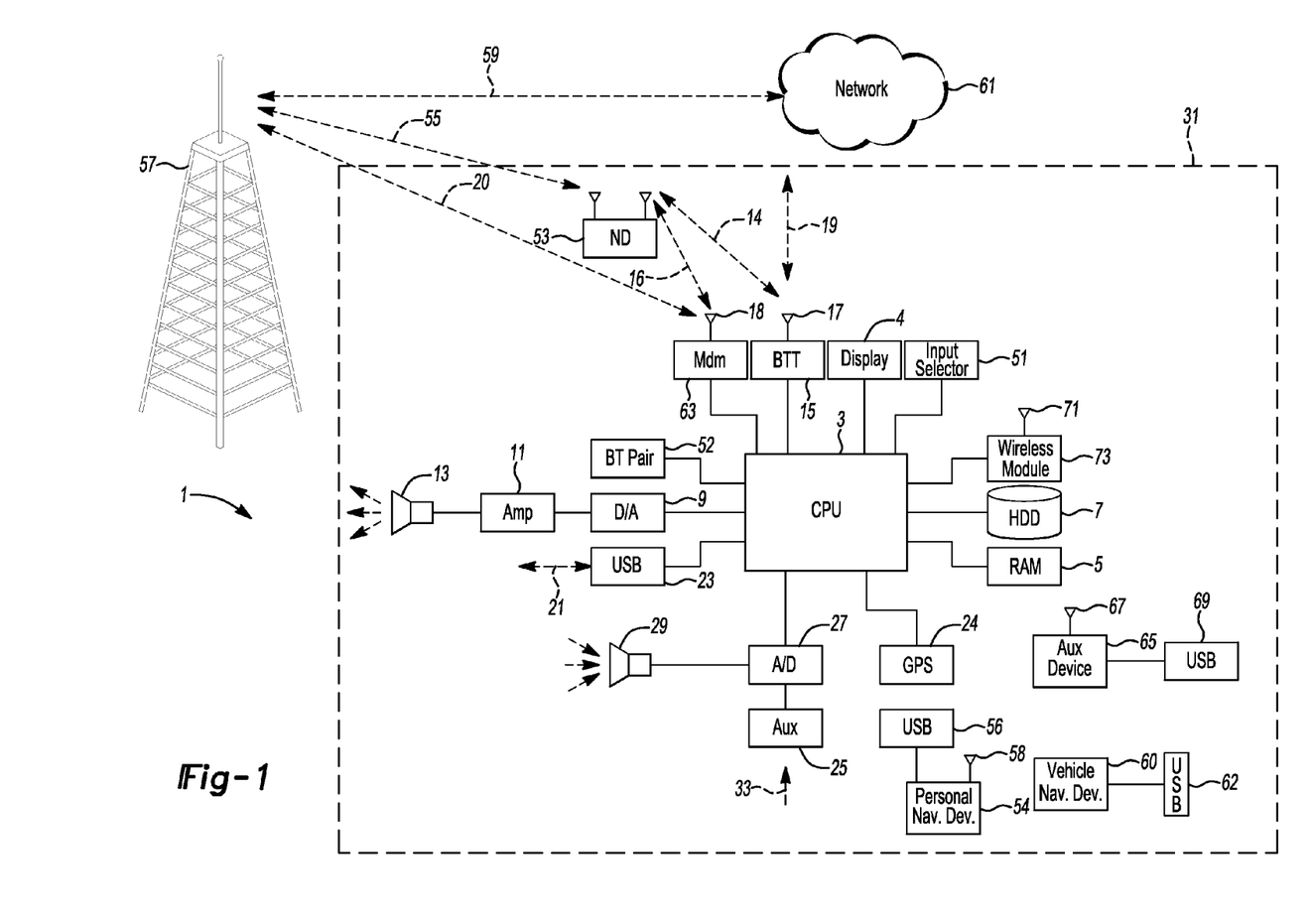
FIG. 1 illustrates an example block topology for a vehicle-based computing system for a vehicle.

FIG. 1 illustrates an example block topology for a vehicle-based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle 31. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 or central processing unit (CPU) 3 controls at least some portion of the operation of the vehicle-based computing system. Provided within the vehicle 31, the processor 3 allows onboard processing of commands and routines. Further, the processor 3 is connected to both non-persistent 5 and persistent storage 7. In this illustrative embodiment, the non-persistent storage 5 is random access memory (RAM) and the persistent storage 7 is a hard disk drive (HDD) or flash memory. In general, persistent (non-transitory) storage 7 can include all forms of memory that maintain data when a computer or other device is powered down. These include, but are not limited to, HDDs, compact disks (CDs), digital versatile disks (DVDs), magnetic tapes, solid state drives, portable universal serial bus (USB) drives and any other suitable form of persistent storage 7.

The processor 3 is also provided with a number of different inputs allowing the user to interface with the processor 3. In this illustrative embodiment, a microphone 29, an auxiliary input 25 (for input 33), a USB input 23, a global positioning system (GPS) input 24, a screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor 3. Although not shown, numerous of the vehicle components and auxiliary components in communication with the VCS 1 may use a vehicle network (such as, but not limited to, a car area network (CAN) bus) to pass data to and from the VCS 1 (or components thereof).

Outputs to the VCS system 1 can include, but are not limited to, a visual display 4 and a speaker 13 or stereo system output. The speaker 13 is connected to an amplifier 11 and receives its signal from the processor 3 through a digital-to-analog converter 9. Output can also be made to a remote BLUETOOTH device such as personal navigation device (PND) 54 or a USB device such as vehicle navigation device 60 along the bi-directional data streams shown at 19 and 21 respectively.

In one illustrative embodiment, the system 1 uses the BLUETOOTH transceiver 15 to communicate 17 with a nomadic device (ND) 53 (e.g., cell phone, smart phone, PDA, or any other device having wireless remote network connectivity). The nomadic device 53 can then be used to communicate 59 with a network 61 outside the vehicle 31 through, for example, communication 55 with a cellular tower 57. In some embodiments, tower 57 may be a WiFi access point.

Exemplary communication between the nomadic device 53 and the BLUETOOTH transceiver is represented by communication 14.

Pairing a nomadic device 53 and the BLUETOOTH transceiver 15 can be instructed through a button 52 or similar input. Accordingly, the CPU is instructed that the onboard BLUETOOTH transceiver 15 will be paired with a BLUETOOTH transceiver in a nomadic device 53.

Data may be communicated between CPU 3 and network 61 utilizing, for example, a data-plan, data over voice, or dual-tone multiple frequency (DTMF) tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem 63 and communication 20 may be cellular communication.

In one illustrative embodiment, the processor 3 is provided with an operating system including an API to communicate with modem application software. The modem application software may access an embedded module or firmware on the BLUETOOTH transceiver to complete wireless communication with a remote BLUETOOTH transceiver (such as that found in a nomadic device). BLUETOOTH is a subset of the Institute of Electrical and Electronics Engineers (IEEE) 802 personal area network (PAN) protocols. IEEE 802 local area network (LAN) protocols include wireless fidelity (WiFi) and have considerable cross-functionality with IEEE 802 PAN. Both are suitable for wireless communication within a vehicle 31. Another communication means that can be used in this realm is free-space optical communication (such as infrared data association (IrDA)) and non-standardized consumer infrared (IR) protocols.

In another embodiment, nomadic device 53 includes a modem for voice band or broadband data communication. In the data-over-voice embodiment, a technique known as frequency division multiplexing may be implemented when the owner of the nomadic device 53 can talk over the device while data is being transferred. At other times, when the owner is not using the device, the data transfer can use the whole bandwidth (300 Hz to 3.4 kHz in one example). While frequency division multiplexing may be common for analog cellular communication between the vehicle 31 and the Internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle 31. 3G standards are now being replaced by IMT-Advanced (4G) which offers 200 mbs for users in a vehicle 31 and 1 gbs for stationary users. If the user has a data-plan associated with the nomadic device 53, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless LAN device capable of communication over, for example (and without limitation), an 802.11g network (i.e., WiFi) or a WiMax network.

In one embodiment, incoming data can be passed through the nomadic device 53 via a data-over-voice or data-plan, through the onboard BLUETOOTH transceiver and into the processor 3 of the vehicle 31. In the case of certain temporary data, for example, the data can be stored on the HDD or other storage media 7 until such time as the data is no longer needed.

Additional sources that may interface with the vehicle 31 include a PND 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU 3 could be in communication with a variety of other auxiliary devices 65. These devices 65 can be connected through a wireless 67 or wired 69 connection. Auxiliary device 65 may include, but are not limited to, personal media players, wireless health devices, portable computers, and the like.

Also, or alternatively, the CPU 3 could be connected to a vehicle-based wireless router 73, using for example a WiFi (IEEE 803.11) 71 transceiver. This could allow the CPU 3 to connect to remote networks within range of the local router 73.

In addition to having exemplary processes executed by a vehicle computing system located in a vehicle 31, in certain embodiments, the exemplary processes may be executed at least in part by one or more computing systems external to and in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process includes a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the VCS 1 located within the vehicle 31 itself is capable of performing the exemplary processes.

Figure 2:
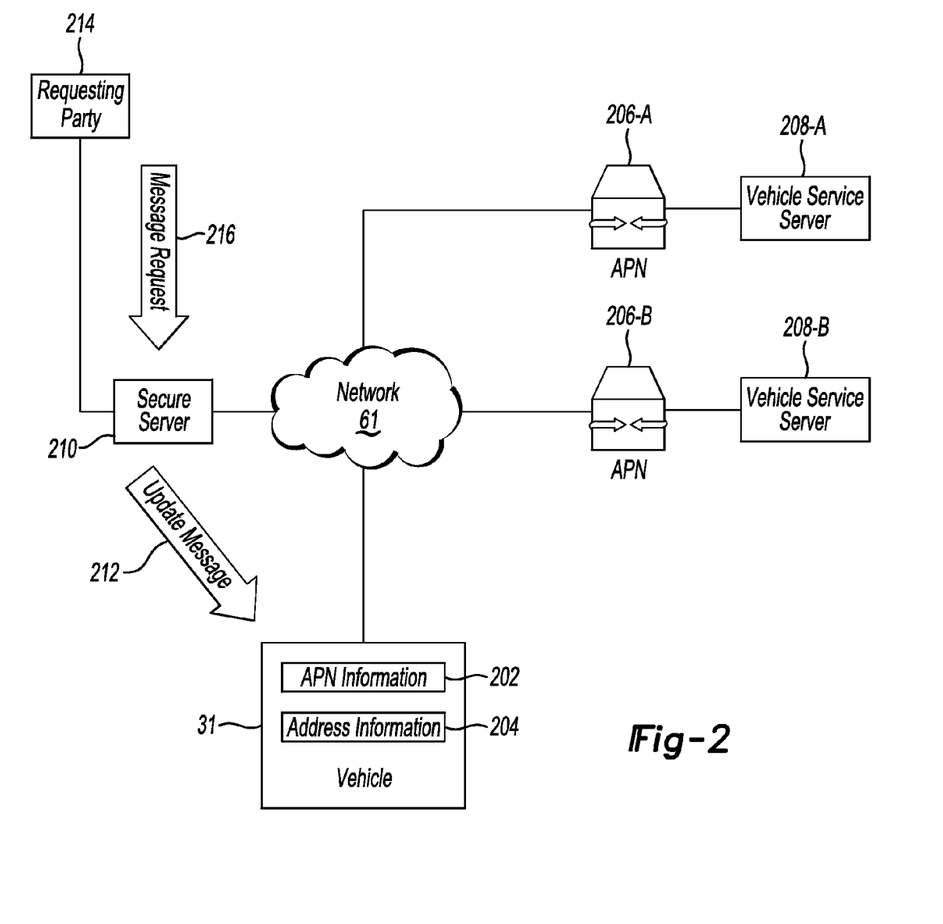
FIG. 2 illustrates an exemplary vehicle, vehicle service servers and secure server in communication over a network.

FIG. 2 illustrates an exemplary vehicle 31, vehicle service servers 208-A and 208-B (collectively vehicle service servers 208) and secure server 210 in communications over a network 61. The vehicle 31 may utilize APN information 202 maintained in the storage 7 of the vehicle 31 to connect the onboard modem 63 of the vehicle 31 to an APN 206. The APN information 202 may include, as some examples, an address of a server reachable over the APN 206 through which network services may be available, domain name server settings, and security settings such as username, password or other authentication information. The vehicle 31 may further utilize address information 204 maintained in the storage 7 of the vehicle 31 to connect to a vehicle service server 208 over the APN 206. The address information 204 may include a URL (in some cases including a port identifier) or other address identifier of a vehicle service server 208 reachable over the connected APN 206. Using the vehicle service server 208, the vehicle 31 may receive notifications targeted to the vehicle 31, send updates of vehicle 31 status to the vehicle service server 208, and otherwise interact with the vehicle service server 208 to facilities the provisioning of services (e.g., directions, weather, software update, etc.) to the vehicle 31 or to occupants of the vehicle 31.

The secure server 210 may be in communication with the vehicle 31 over the network 61, over a communication channel separate from the APN 206. Accordingly, the secure server 210 may be configured to provide, and the modem 63 of the vehicle 31 may be configured to receive, update messages 212 over the network 61. Moreover, these update messages 212 may be received regardless of the status of the vehicle 31 connection to the APN 206 or vehicle service server 208. As one possibility, the update messages 212 may be SMS messages received from a cellular tower 57 with which the modem 63 of the vehicle 31 is in communication, out-of-band from the APN 206 connection to the vehicle service server 208.

The update message 212 may include one or more of updated APN information 202 and updated address information 204. When received, the information of the update message 212 may be used by the vehicle 31 to update the connection of the vehicle 31 to the APN 206 and vehicle service server 208. For example, the vehicle 31 may be configured to disconnect from the APN 206 and vehicle service server 208, and reconnect to the updated APN 206 and vehicle service server 208 settings as provided for in the received update message 212. The vehicle 31 may be further configured to maintain the updated information in the storage 7 of the vehicle 31 for use in later reconnection to the vehicle service server 208.

In many cases, the update message 212 may specify both new address information 204 and new APN information 202. In such a case, the vehicle 31 may disconnect from the current vehicle service server 208 and APN 206, and may connect to the APN 206 and vehicle service server 208 specified by the new address information 204 and new APN information 202. In other cases, the update message 212 may specify new address information 204 but not new APN information 202. This may cause the vehicle 31 to connect to a different vehicle service server 208 within the same APN 206 (with or without first disconnecting from the APN 206). As another possibility, an update message 212 may specify new APN information 202 but not new address information 204. This may cause the vehicle 31 to connect to the same vehicle service server 208 via a different APN 206. By allowing the update message 212 to change only certain aspects of connection information, the update messages 212 may be used to identify and diagnose vehicle 31 connection issues, such as that a vehicle 31 may be able to reach a vehicle service server 208 over certain APNs 206, but not over other APNs 206, or that the vehicle 31 may be able to reach certain vehicle service servers 208 over an APN 206, but not other vehicle service servers 208 over the same APN 206.

To ensure that the APN information 202 and address information 204 cannot be changed by a user or party unauthorized to do so (e.g., a system not under the control of the vehicle manufacturer or its affiliates or partners), the update message 212 may be encrypted. For example, the update message 212 may be encrypted or signed according to a key known by the secure server 210, but unknown to unauthorized users or other parties, such that the update message 212 is able to be decrypted by the vehicle 31. As one possibility, the encryption of the update messages 212 may be performed according to the advanced encryption standard (AES). As the key required to provide the update messages 212 may remain secret, a rouge actor or malicious user may be unable to spoof or alter an update message 212 to redirect the vehicle 31 to a malicious or otherwise unauthorized APN 206 or vehicle service server 208.

To facilitate the generation of update messages 212, the secure server 210 may be configured to receive message requests 216 from requesting parties 214. Exemplary requesting parties 214 may include vehicle manufacturers, vehicle dealers or repair facilities, and third-party technology partners managing connections to their vehicle service servers 208. The message request 216 may include an identifier of an intended recipient vehicle 31 (or vehicles 31) to which the update message 212 is intended. The vehicle 31 may be specified as one or more of a VIN associated with the vehicle 31, subscriber identity module (SIM) information of the modem 63 such as international mobile station equipment identity (IMEI), phone number associated with the vehicle 31 as some examples. As another possibility, the message request 216 may indicate that the update is to be provided to all vehicles 31. The message request 216 may further include updated connection information to be used to update the connection of the vehicle 31 to a vehicle service server 208 over an APN 206. The updated connection information may include one or more of updated APN information 202 and updated address information 204. The update message 212 may be generated and sent from the secure server 210 to the specified vehicles 31 using the updated connection information.

To further ensure system security, in some cases the secure server 210 may be configured to authenticate one or more of the message requests 216 and requesting party 214. For instance, the requesting party may validate the identity of the requesting party 214 (e.g., by IP address, network location, etc.) and/or login credentials (e.g., username, password, token, challenge/response, etc.) before providing the update message 212 to the vehicle 31.

As one possible scenario, a first technology partner of a vehicle manufacturer may provide certain vehicle 31 services by way of the vehicle service server 208-A. To reduce latency and messaging delays, the vehicles 31 may connect to the vehicle service server 208-A of Partner A using the APN 206-A, without routing through a server of the vehicle manufacturer. At some point, the Partner A may elect to exit the technology partner business and may no longer wish to maintain or support upgrades to the vehicle service server 208-A. To address the situation, the vehicle manufacturer may provide, as a requesting party 214, message requests 216 to the secure server 210, where the message requests 216 including updated APN information 202 and address information 204 to repoint the requested vehicles 31 away from the technology provider. For example, the message requests 216 may include updated APN information 202 and address information 204 to repoint the requested vehicles 31 to the APN 206-B and vehicle service server 208-B. The secure server 210 may accordingly provide update messages 212 to the requested vehicles 31 to repoint them to the APN 206-B and vehicle service server 208-B.

As another possible scenario, an individual vehicle 31 may be experiencing an issue with its connection to a vehicle service server 208. To diagnose the issue, a vehicle dealer or repair facility as requesting party 214 may provide message requests 216 to the secure server 210 to attempt to rule out various factors. For example, the requesting party 214 may point the vehicle 31 to a test vehicle service server 208 over the existing APN 206 as a test, thereby testing whether the vehicle 31 is experiencing an issue with the vehicle service server 208 and not the network itself. As another possibility, the requesting party 214 may point the vehicle 31 to the same vehicle service server 208-A but over a different APN 206, thereby testing network connectivity to the APN 206 but not the vehicle service server 208-A.

Figure 3:
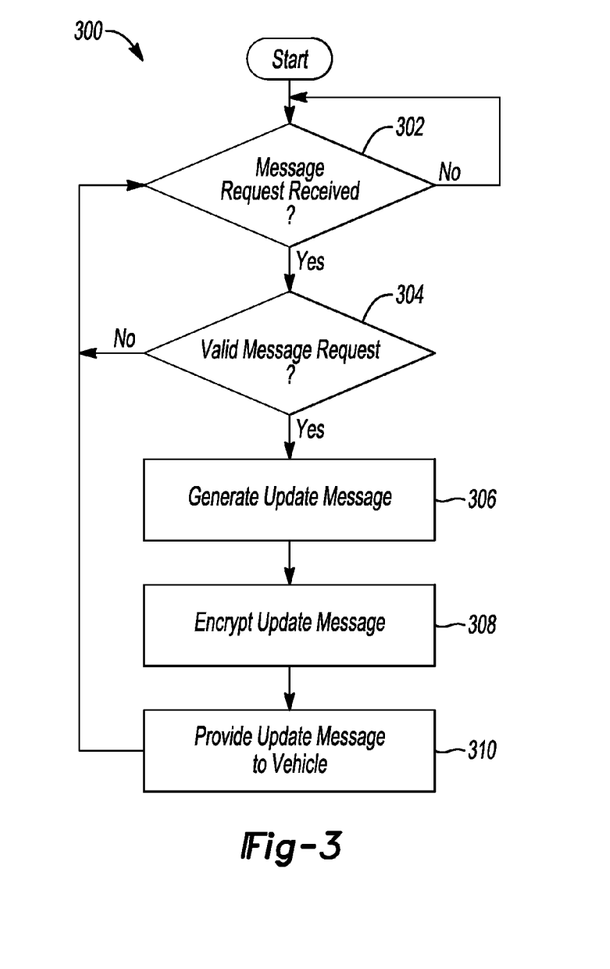
FIG. 3 illustrates an exemplary process for the generation of update messages.

FIG. 3 illustrates an exemplary process 300 for the generation of update messages 212. The process 300 may be performed, for example, by a secure server 210 in communication with vehicles 31 over a network 61.

At decision point 302, the secure server 210 determines whether a message request 216 was received. For example, the secure server 210 may listen for message requests 216 from requesting parties 214 such as vehicle manufacturers, vehicle dealers or repair facilities, and third-party technology partners managing connections to their vehicle service servers 208. If a message request 216 was received, control passes to decision point 304. Otherwise, control remains at decision point 302.

At decision point 304, the secure server 210 determines whether the message request 216 is valid. For example, the secure server 210 may validate the identity of the requesting party 214 (e.g., by IP address, challenge/response, etc.). As another example, the secure server 210 may validate login credentials (e.g., username, password, token, etc.) included in the message request 216 or otherwise provided by the requesting party 214. If the message request 216 is determined to be valid, control passes to block 306. Otherwise, control passes to decision point 302.

At block 306, the secure server 210 generates an update message 212. For example, the secure server 210 may include the updated information from the message request 216 in an update message 212 addressed to the vehicle 31 or vehicles 31 as specified by the message request 216. The updated information may include one or more of updated APN information 202 and updated address information 204.

At block 308, the secure server 210 encrypts the generated update message 212. For example, the secure server 210 may utilize AES to encrypt the update message 212 according to a secret key utilized for update message 212 generation.

At block 310, the secure server 210 provides the update message 212 to the vehicle 31 or vehicles 31 specified by the message request 216. As one possibility, the secure server 210 may send the update message 212 to the vehicle 31 or vehicles 31 using SMS. Notably, the update message 212 is provided by the secure server 210 out-of-band from the APN 206 connection to the vehicle service server 208, thereby allowing the update message 212 to be provided to the vehicle 31 regardless of the status of the vehicle 31 connection to the APN 206 or to the vehicle service server 208. After block 310, control passes to decision point 302.

Figure 4:
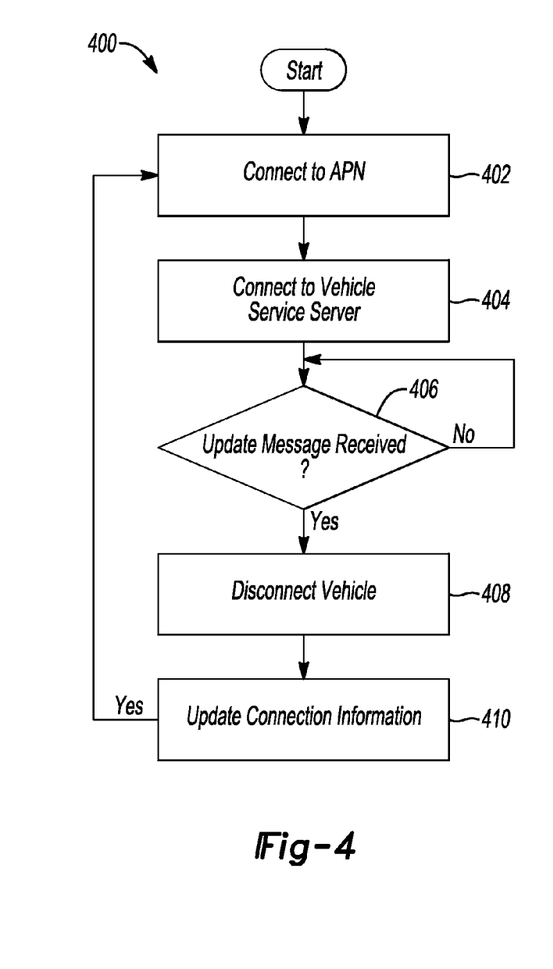
FIG. 4 illustrates an exemplary process for the updating of access point network information and address information for a vehicle.

FIG. 4 illustrates an exemplary process 400 for the updating of APN information 202 and address information 204 for a vehicle 31. The process 300 may be performed, for example, by a vehicle 31 in communication with a secure server 210 over a network 61.

At block 402, the vehicle 31 connects to an APN 206. For example, upon key-on or upon a request for use of a connected service, the vehicle 31 may retrieve APN information 202 maintained in storage 7 of the vehicle 31, and may use the retrieved APN information 202 to connect the onboard modem 63 of the vehicle 31 to an APN 206. In some cases, a vehicle 31 may be set with initial APN information 202 when built, while in other cases the APN information 202 may have been updated post-build, such as by way of a previously-received update message 212.

At block 404, the vehicle 31 connects to a vehicle service server 208. For example, the vehicle 31 may retrieve address information 204 maintained in storage 7 of the vehicle 31, and upon connection to the APN 206 may use the retrieved address information 204 to connect to a vehicle service server 208 over the APN 206. In some cases, a vehicle 31 may be set with initial address information 204 when built, while in other cases the address information 204 may have been updated post-build, such as by way of a previously-received update message 212.

At decision point 406, the vehicle 31 determines whether an update message 212 has been received. For example, the vehicle 31 may listen for SMS update messages 212 to be received from a cellular tower 57 with which the modem 63 of the vehicle 31 is in communication, out-of-band from the APN 206 connection to the vehicle service server 208. If an update message 212 is received, control passes to block 408. Otherwise, control remains at decision point 406, and the vehicle 31 may maintain the communication channel over the network 61 between the vehicle 31 and the vehicle service server 208 accessible through the APN 206.

At block 408, the vehicle 31 disconnects from the APN 206 and vehicle service server 208. For example, the vehicle 31 may instruct the modem 63 to close any open connections via the APN 206 and vehicle service server 208.

At block 410, the vehicle 31 updates the connection information. For example, the vehicle 31 may save the updated the APN information 202 and/or address information 204 in the storage 7 of the vehicle 31. After block 410, control passes to block 402.

Thus, an in-vehicle system 10 may be configured to support remote updating of APN information 202 and address information 204 of the vehicle 31, using update messages 212 that may be provided to the vehicle 31 from a secure server 210, without use of the APN 206 connection to the vehicle service server 208. To ensure message security, the update messages 212 may be encrypted, such as according to the advanced encryption standard (AES), using a secret key unknown to unauthorized users. Requesting parties 214, such as vehicle manufacturers, vehicle dealers or repair facilities, and third-party technology partners managing connections to their vehicle service servers 208, may provide message requests 216 to the secure server 210 to update APN information 202 and address information 204 of the vehicle 31. Accordingly, the requesting party 214 may temporarily or permanently change the APN 206 and/or vehicle service server 208 to which the vehicle 31 may connect, without depending on the current vehicle service server 208 (or a maintainer of the vehicle service server 208) to aid in the update.

By using the secure server 210 to update APN information 202 and address information 204 of the vehicle 31, the system 10 may provide a safe and secure approach for rerouting network traffic to serve vehicle 31 owners and technology partners. The approach may accordingly allow for the flexibility of allowing requesting parties 214 to securely update one, many, or substantially all vehicles 31 with new APN information 202 and address information 204. Moreover, the disclosed approach avoids situations in which traffic must be routed through an intermediate server or proxy to allow the requesting party to maintain control, as such situations involve additional costs in maintenance of the proxy as well as in traffic latency and potential for network downtime. Yet further, the disclosed approach provides the requesting party 214 with the ability to perform troubleshooting by changing APN information 202 and address information 204 of the vehicle 31 independently.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-implemented method comprising:
maintaining a communication channel over a network between a vehicle and a vehicle service server accessible through an access point node;
receiving, over the network out-of-band from the communication channel, an update message including updated communication channel connection information; and
upon receiving the message, reconnecting the communication channel according to the updated connection information.

2. The method of claim 1, further comprising receiving the update message over cellular short messaging service.

3. The method of claim 1, further comprising decrypting the update message according to a decryption key corresponding to an encryption performed to the update message by a secure server sending the update message.

4. The method of claim 1, further comprising updating connection information stored by the vehicle according to the update message.

5. The method of claim 4, the connection information including access point node information specifying connection parameters to connect the vehicle to the access point node, and address information specifying an address of the vehicle service server reachable over the access point node and providing at least one network service to the vehicle.

6. The method of claim 5, the updated connection information specifying at least one of updated access point node information and updated address information.

7. A vehicle comprising:
a modem configured to maintain a communication channel over a network between the vehicle and a vehicle service server accessible through an access point node; and
a controller configured to
receive, from the modem over the network out-of-band from the communication channel, an update message including updated communication channel connection information; and
responsive to receiving the message, direct the modem to reconnect the communication channel according to the updated connection information.

8. The vehicle of claim 7, the controller further configured to receive the update message over cellular short messaging service.

9. The vehicle of claim 7, the controller further configured to decrypt the update message according to a decryption key corresponding to an encryption performed to the update message by a secure server sending the update message.

10. The vehicle of claim 7, the controller further configured to update connection information stored by the vehicle according to the update message.

11. The vehicle of claim 10, the connection information including access point node information specifying connection parameters to connect the vehicle to the access point node, and address information specifying an address of the vehicle service server reachable over the access point node and providing at least one network service to the vehicle.

12. The vehicle of claim 11, the updated connection information specifying at least one of updated access point node information and updated address information.

13. A system comprising:
a secure server configured to:

generate an update message specifying at least one of updated access point node information and updated address information;

encrypt the update message according to an encryption key shared with a vehicle destination; and provide the update message over a network to a vehicle out-of-band from a communication channel between the vehicle and a vehicle service server accessible through an access point node.

14. The system of claim 13, wherein the secure server is further configured to provide the update message over cellular short messaging service.

15. The system of claim 13, wherein the secure server is further configured to validate, before providing the update message to the vehicle, at least one of (i) an identity of a party requesting the update message be sent to the vehicle and (ii) login credentials received from the party requesting the update message.

16. The system of claim 13, the access point node information specifying connection parameters to connect the vehicle to the access point node, the address information specifying an address of the vehicle service server reachable over the access point node and providing at least one network service to the vehicle.

17. The system of claim 13, further comprising the vehicle, wherein the vehicle is configured to:

maintain a communication channel over the network between the vehicle and the service server;

receive the update message; and upon receiving the message, reconnect the communication channel according to the at least one of updated access point node information and updated address information.

18. The system of claim 17, the vehicle further configured to receive the update message over cellular short messaging service.

19. The system of claim 17, the vehicle further configured to decrypt the update message according to a decryption key corresponding to an encryption performed to the update message by a secure server sending the update message.

20. The system of claim 17, the vehicle further configured to update connection information stored by the vehicle according to the update message.

* * * * *